United States Patent [19]

Wiers

[11] 3,828,356

[45] Aug. 6, 1974

[54] PLURAL CHANNEL RECORDER

[75] Inventor: William C. Wiers, Ann Arbor, Mich.

[73] Assignee: Automation Industries, Inc., Los Angeles, Calif.

[22] Filed: Dec. 27, 1971

[21] Appl. No.: 211,887

[52] U.S. Cl. .......... 346/108, 346/136

[51] Int. Cl. .......... G01d 9/38

[58] Field of Search .......... 346/107 R, 108, 33 P, 136

[56] References Cited

UNITED STATES PATENTS

| | | | |
|---|---|---|---|
| 2,415,879 | 2/1947 | Hassler | 346/108 |
| 2,891,166 | 6/1959 | Piety | 346/108 X |
| 3,184,752 | 5/1965 | Weller | 346/108 |
| 3,354,465 | 11/1967 | Merritt et al. | 346/109 |
| 3,430,256 | 2/1969 | Goodman | 346/107 R |
| 3,438,057 | 4/1969 | Neitzel | 346/107 R |
| 3,738,242 | 6/1973 | Lee et al. | 95/12 |

*Primary Examiner*—Joseph W. Hartary
*Attorney, Agent, or Firm*—Dan R. Sadler

[57] ABSTRACT

A nondestructive testing system is disclosed which is adapted to scan a workpiece and generate large quantities of data relating to the characteristics of the workpiece. In addition, a recorder is disclosed for accumulating and storing the large quantities of data generated by the nondestructive testing system. The recorder utilizes a continuously moving photographic film and a plurality of light-emitting diodes for exposing a plurality of channels or tracks of data on the film. A cross-correlator is also disclosed for optically comparing or correlating the data recorded on the film with preselected references or standards. The cross-correlator includes an optical system which optically performs a spatial Fourier transform of the recorded data, compares or correlates the spatial Fourier transform with a corresponding spatial Fourier transform of the reference or standard and then performs an inverse spatial transform of the results of the comparison.

7 Claims, 10 Drawing Figures

William C. Wiers,
INVENTOR.
BY.
[signature]
ATTORNEY.

PLURAL CHANNEL RECORDER

BACKGROUND

There are numerous instances when it is desirable to accumulate large quantities of interrelated data and to then correlate this data with some standard or reference to determine whether the data falls within predetermined patterns. For example, in a nondestructive testing system for inspecting a workpiece, it is desirable to be able to inspect large volumes of materials at a high rate of speed and to interpret the resultant large volumes of data with little or no human intervention.

One type of nondestructive testing system of this nature is a so-called pipeline pig which travels through a cross-country transmission pipeline filled with a fluid such as gas, oil, etc. As the pig travels through the pipeline various probes or search units simultaneously scan a large number of separate, narrow scan paths extending along the pipeline. The inspection results or test data for each individual scan path is accumulated in a recorder carried onboard the pig. When the pig completes its trip and is recovered from the pipeline, the recordings are removed from the pig and then analyzed to determine whether or not there are any defects along any of the scan paths.

When scanning an extended length of a large workpiece such as a buried cross-country pipeline, it is desirable to subdivide the inside surface of the pipeline into a large number of relatively narrow scan paths. For example, if a pipeline having a diameter of, say, 20 inches, is subdivided into scan paths one-half inch wide, this would result in about 125 separate, individual scan paths.

One means of inspecting such a pipeline is to place a so-called pig in the pipeline. The pig includes a system for individually inspecting the pipelines and recording the results of the inspection. Very frequently the pig must travel as much as 50 or 75 miles (i.e., up to 8 or 10 hours) within the pipeline before it can be removed. As a consequence, all of the data from all the channels must be accumulated and stored for all of this testing.

Heretofore, the most satisfactory means for accumulating and recording all of this data has been a so-called magnetic tape recorder. In a recorder of this nature the data signals are recorded on a continuously moving magnetic tape. As a practical matter, it has been found the data "packing limit" for such a tape recorder using a 35mm tape prevents recording in excess of about 34 channels with about 53 cycles per millimeter. As a result the magnetic tape recorder is of a prohibitive size and cost and/or is not accumulating and separately recording all of the data.

After the resting has been completed the magnetic tape may be "played back" through a magnetic tape reproducer whereby the original data signals are reproduced. These signals are then displayed on an oscilloscope or recorded on a papertape whereby a skilled operator may manually interpret the test results.

SUMMARY

The present invention provides means for overcoming the foregoing difficulties. More particularly, a recorder is provided which is not only capable of accumulating large amounts of data and individually recording the data in separate channels but is also relatively inexpensive and very compact in size In thelimited number of embodiments disclosed herein, this is accomplished by utilizing a photographic film such as a 35mm film and light-emitting diodes for exposing separate tracks on the film. A separate light-emitting diode is provided for each channel of data to be recorded. Because of the much higher packing limit it has been found such an arrangement permits at least 200 separate channels to be recorded on a single 35mm filmstrip with at least 200 cycles per millimeter.

In addition, a cross-correlator is provided whereby the data recorded in the channels can be automatically matched or correlated with known standards to determine when preselected patterns are present. In one embodiment disclosed herein this is accomplished optically by means of a pair of lenses and an optical filter.

A first lens focused upon the data film projects the recordings on the film into an image which is a spatial Fourier transform of all the data on the film. The image is projected onto the filter. The filter includes an optical pattern which is the spatial Fourier transform of the various patterns which are to be recognized. Only the data recorded on the original film which has the preselected patterns will result in the image projected onto the filter matching with the pattern on the filter. The only time it is possible for the light to pass through the filter occurs when the projected image matches the image on the filter. The only time this occurs is when a preselected pattern is present in the original recording.

The second lens is focused on the filter and converts the light passing therethrough (by means of an inverse spatial transform) into characteristic patterns. The characteristic patterns may be visually observed by the operator and/or recorded on a second film to insure a permanent record. As a consequence, the readings of the second film will indicate the presence or absence of those patterns which it is desired to recognize An unskilled operator may then very quickly scan the second film to detect any indications recorded thereon.

DRAWINGS

DESCRIPTION

Figure 1:
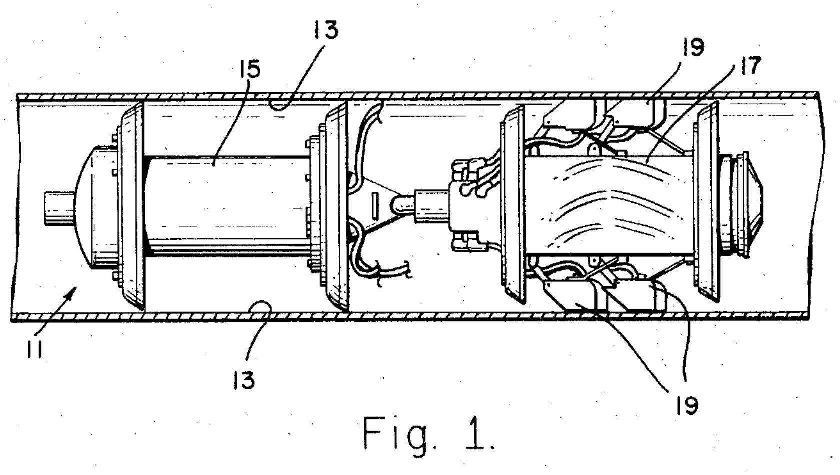
FIG. 1 is a side view of a pipeline pig traveling through a pipeline for nondestructively inspecting the pipeline and carrying a recorder embodying the present invention and adapted to record the results of the nondestructive inspection of the pipeline.

The present invention may be used for a wide variety of different purposes. It is particularly useful wherever it is desired to accumulate large quantities of data and/or analyze such data. For example, it may be used as a "flight recorder" on an aircraft for accumulating data relating to the operational and flight characteristics of the aircraft, a recorder for monitoring the various conditions of a patient, etc.

However, for illustrative purposes in the present instance it is shown herein as being particularly adapted to be embodied in a nondestructive testing system 10 for inspecting workpieces and generating large quantities of data relating to the characteristics of the workpiece, a recorder 12 for accumulating and storing all of the data generated by the nondestructive testing system 10 and a cross-correlator 14 for interpreting the dsta stored by the recorder 12 and indicating the characteristics of the workpiece.

The nondestructive testing system 10 may be of any desired variety. For example, the system 10 may be embodied in a pipeline pig 11.

The pipeline pig 11 is a vehicle adapted to travel through a cross-country pipeline 13 used for transmitting fluids such as gas, oil, etc. The pig 11 includes a front section 15 and a rear section 17 which are adapted to be placed in the pipeline 13 at a first location such as a pumping station. The pig 11 is then carried through the pipeline by the fluid flowing therethrough to a second location such as a subsequent pumping station. The pig 11 is then recovered at the second location by removing it from the pipeline 13.

The front section 15 normally includes one or more batteries and is adapted to act as the power supply for the entire pig 11. The section 17 acts as the "instrument package" and includes the nondestructive testing system 10 and the recorder 12 for recording or accumulating the data from the nondesctructive testing system 10. A plurality of detector shoes 19 is mounted on the outside of the second section 17. The shoes are adapted to resiliently expand radially outwardly whereby they will be maintained in intimate sliding contact with the inside surface of the pipeline 13 as the pig 12 travels therethrough.

Each detector shoe, in turn, includes a substantial number of individual probes 16. Each of the individual probes 16 is adapted to scan along a preselected scan path on the inside surface of the pipeline. The size of the probes 16, scan paths, etc., are dependent upon the degree of resolution desired, etc.

By way of example, it may be desirable for each of the probes 16 to cover a scan path on the order of one-half inch wide whereby each probe is capable of resolving defects of a comparable size. In a pipeline of 20 inches in diameter, this requires about 125 to 150 separate probes 16.

As each probe 16 scans the surface, it produces a signal which corresponds to the characteristics of the workpiece. The nature of the signal, of course, depends upon the type of probe, the characteristics of the workpiece, etc. However, normally, if the workpiece is of a uniform nature and free from any discontinuities such as flaws, defects, etc., the signal will be substantially uniform. However, if there are any discontinuities such as defects like cracks, pits, thin wall, etc., each probe 16 passing over the discontinuity will produce a signal. The exact nature of the signal may vary considerably.

By way of example, the amplitude, frequency, phase and/or duration, etc., are all functions of the size and type of discontinuity. Accordingly, by analyzing the signal it is possible to determine the characteristics of the discontinuity.

The probes 16 are coupled to a channel driver 18. The channel driver 18 is in reality a group of parallel amplifiers **18*a* through 18*n*. There is a separate amplifier or channel for each probe 16**.

Each channel or amplifier **18*a* through 18*n* is effective to increase the signal from the respective probe 16** to a more useful level, improve the signal-to-noise ratio, prevent loading of the probe whereby the linearity of the probe is preserved, and/or match impedances, etc. Under some circumstances and with some types of probes, the signals may be large enough to avoid the necessity for the channel driver.

When the system 10 is embodied in a pig traveling through a pipeline it is not practical for the data to be analyzed in real time. Instead, the data is stored until the pig can be retrieved from the pipeline. Accordingly, the plurality of separate outputs from the channel driver 18 is coupled to separate channels in the recorder 12.

As best seen in FIGS. 2 through 5 the recorder 12 is embodied in a cylindrical housing 21 which separates into two separate parts 23 and 25. The housing 21 is adapted to fit snugly into the interior of the second section 17 of the pig 11. The rear end or plug on the second section may be unscrewed to remove the housing from the section 17 or screwed inwardly to seal the recorder inside of the section. The recorder 12 includes a separate channel for each of the probes 16. The recorder 12 may be of any suitable design. However, in the present instance it utilizes a photographic film 22 sensitive to visible light. By way of example, it has been found the photographic film 22, the supply reel 24, the take-up reel 26, the film transport 28, exposure means, etc., are normally all enclosed within a light-tight cassette 27. The cassette 27 is adapted to be mounted upon the main-frame 29 in the housing 21. It has been found that for most applications an essentially standard black-and-white 35mm film is suitable. By adjusting the gain of each amplifier in the driver 18, the sensitivities for the channels can all be normalized and/or coordinated whereby the recorded information corresponds to the magnitude of the signal. It should be understood as an alternative color film may be used to increase the capacity to store data. Also the film may be sensitive to other types of energy such as heat or infrared radiations, etc.

The film 22 is normally initially stored in a supply reel 24. The film transport 28 is then effective to transfer the film 22 over to a take-up reel 26. The film transport 28 for transferring the film includes a constant torque motor 30 connected to the supply reel 24, a guide 32, a guide roller 34, a sprocket wheel or capstan 36, a drive motor 38, a guide 40 and a constant torque motor 42 connected to the take-up reel 26.

The two constant torque motors 30 and 42 are not intended to drive the two reels 24 and 26. Instead they are primarily intended to maintain constant torques on the reels whereby the film 22 passing through the film transport 28 is kept under constant tension.

The first guide 32 is effective to strip the film 22 from the supply reel 24. The guide 32 simultaneously rolls and bends the film 22 through a 90° turn so as to direct it toward the opposite or take-up reel 26. The other guide 40 also rolls and bends the film 22 through another 90° turn so as to feed it onto the take-up reel 26.

This form of guide permits the two reels 24 and 26 being positioned parallel to each other. This is particularly useful when the recorder 12 is to be installed in a cylindrical structure such as a pipeline pig. However, if desired, any other convenient disposition of the reels 24 and 26 may be employed.

The sprocket wheel or capstan 36 is driven by the motor 38. As indicated above, the constant torque motors 30 and 42 do not drive the film 22 but merely control the tension in the film 22. It is the function of the motor 38 and capstan 36 to drive the film 22 through the exposure area.

Under some circumstances it may be desirable to drive the film 22 at a uniform or constant rate. In this event the motor 38 is of a constant speed variety, and the distance along the film 22 is a linear function of time.

However, as in the present instance it is desirable to vary the speed at which the film 22 is advanced through the exposure area. If the inspection speed or scan rate varies, such as in a pipeline pig, by varying the rate at which the film 22 travels displacement along the film 22 becomes a function of the distance along the workpiece, i.e., the pipeline. To accomplish this the motor 38 is of the variable speed variety. The operation of the motor 38 and how it is regulated by the motor control are explained subsequently in more detail.

The signals on the outputs from the channel driver are of the analog variety. Each of these signals is recorded upon the film in its analog form by exposing the film as it is advanced through the exposure area by the film transport 28.

The exposure of the film 22 may be accomplished by any suitable means. For example, if the film 22 is sensitive to infrared heat, a thermal element such as a hot wire may be provided for each channel. These will, in turn, form separate images upon the film whereby the film will be exposed accordingly.

In the present instance the film 22 is of the conventional photographic variety sensitive to visible light. Accordingly, each channel of the driver 18 is coupled to a device which luminesces with visible light as an analog function of the analog amplitude of the signal applied thereto. By way of example, it has been found that light-emitting diodes 44 are particularly well suited for this purpose.

Each of the diodes 44 is independently coupled to its individual, respective channel in the driver 18. As a consequence, each of the diodes 44 will luminesce or glow with an analog intensity which is a function of the amplitude of the signal coupled into the associated channel of the driver 18 from the respective pickup probe 16.

Although the diodes 44 may be arranged in various preselected patterns, they are usually arranged in a straight line at right angles to the film 22 as it passes through the exposure area between the guide roller 34 and capstan 36. By spacing the diode array 46 from the film 22 and using one or more lenses 48, the light emitted from the diodes 44 is focused onto the film 22.

It has been found that an array 46 of several hundred diodes may be several times longer than the width of the film 22. However, the lens 48 will reduce the size of the image of the array 46 down to the size compatible with the width of the film 22. As a consequence, the light from up to 200 or more diodes 44 can be focused onto the film 22 to form a similar number of tracks on the film 22.

As the film 22 is drawn through the exposure area by the capstan 36, the image of the luminesce array 46 of diodes 44 will form a series of parallel tracks along the film 22. Since the size of the luminous portion of the diode 44 is constant, the width of each track is substantially constant. However, the optical densities of the tracks will vary as the intensity of the light from the diodes 44 varies.

It is to be noted that in this embodiment the signals from the probes 16 and the signals from the channels in the driver 18 are all analog signals. Also, the amount of light from a diode 44 is an analog, linear function of the magnitude of the signal applied thereto. Since the diodes 44 can only conduct in one direction and since they cannot radiate "negative light," the signals applied to the diodes 44 should be unipolar. If it is necessary to record data signals which swing both sides of zero (i.e., they are bipolar having both positive and negative values), a reference or bias level may be added to the data signal.

This results in a diode 44 glowing at some intermediate level when the data signal is at its quiescent or zero level. This causes a track to be recorded which has a "grey level" corresponding to this zero level. As the data signal varies about the bias level, the density of the track will increase and/or decrease about the grey level.

By using a bias or grey level, some light will be projected onto each of the tracks at substantially all times. As a consequence it will be possible to observe substantially all of the tracks at all times. If the data signal is unipolar and no bias level is employed when the data signal is zero, no light is radiated. As a consequence the recorded track will not be visible and its position must be estimated. It should also be noted that in the absence of a bias level it is not obvious when a recorded track is missing whether this comes from a data signal equal to zero or whether there has been a failure in a channel, a diode, etc.

As the film 22 is transported past the exposure area, the individual tracks are irradiated with beams of light from the diodes 44. The data recorded in each track corresponds to the signal produced by the respective probe 16. Accordingly, by reviewing the film it is possible to determine the data which was produced by each of the probes 16.

As indicated above, if the motor 38 is of a constant speed variety and the film 22 is running at a uniform velocity, the position along the length of the film will correspond to time.

However, if the film travels at a uniform rate while the nondestructive testing system is scanning at an irregular rate, it is not practical to determine from the position on the film 22 the location where the data was generated. Accordingly, it is desirable for the film 22 to be transported at a rate which is a function of the scan speed. In order to accomplish this the drive motor 38 is of the variable-speed variety, and it is regulated by a variable-speed motor control 50.

A velocity circuit 52 is provided for generating a signal which is a function of the speed at which the probes 16 are scanning the workpiece. This circuit 52 may be of any desired variety such as a wheel that rolls along the surface of the workpiece. However, if the recorder 12 is embodied in a pig traveling through a pipeline, it has been found desirable to use a velocity circuit.

This circuit 52 is effective to scan the surface of the pipeline by sensing a preselected combination of the signals from the probes 16. From this combination of signals, the circuitry 52 is effective to generate a speed signal which is a precise function of the speed at which the probes 16 are scanning the surface (i.e., the speed of the pig through the pipeline).

A signal comparator 54 is provided which has a signal input 56, a signal input 58 and a signal output 60. The comparator 54 is effective to compare the signals on the inputs 56 and 58 and produce a signal on the output 60 which equals the difference therebetween.

The input 56 is coupled to the velocity circuit 52 so as to receive the velocity signal. The input 58 is coupled to a tachometer 62. The tachometer 62 is coupled to the motor 38 so as to produce a signal corresponding to the speed of the film 22. As a consequence the difference or error signal from the comparator 54 is a function of the error in the speed at which the film 22 is being driven relative to the speed at which the probes 16 are scanning.

This difference or error signal is, in turn, applied to a control input 64 on the motor control circuit 50. The motor control circuit 50 is effective to increase or decrease the speed of the motor 38 so as to maintain the output signal from the signal comparator 54 substantially zero.

This arrangement is effective to cause the film 22 to travel through the exposure area at a velocity which is a precisely regulated or controlled function of the velocity at which the probes 16 are scanning the surface. As a result, even though the recording speed and/or the time of the recording may vary in an unpredictable manner, the longitudinal distance along the film 22 is precisely and linearly related to distance along the pipeline.

As the speed of the film 22 through the exposure area varies, the exposure tends to vary. For example, assume the data signal and the amount of light radiated by a diode 44 remains constant. If the film 22 is traveling at a slow speed, the track will be overexposed. Conversely, if the film 22 is traveling at a high speed, the track is underexposed. This is, of course, objectionable when the data is being recorded by means of a variable density track.

In order to preserve a uniform exposure (i.e., a constant relationship between the data signal and the density of the track) a bias generator 66 may be provided. This generator 66 is coupled to the output of the tachometer so as to be responsive to the film recording speed. The bias generator 66 is effective to provide a bias signal which is a function of the speed at which the film 22 is traveling.

The output of the generator is coupled to a gain control input 68 on each of the channel drivers **18*a* through 18*n*. As the speed of the film 22 is increasing, the gain control signal causes the gain each of the channel drivers 18*a* through 18*n* to increase. Conversely, when the film speed decreases the gain of each of the drivers 18*a* through 18*n* decreases. It will thus be seen that irrespective of the speeds at which the scanning recordings are occurring the exposures of the tracks will always remain constant for a given signal from the probes 16.**

Under some circumstances it may be desirable to provide additional forms of control and/or compensation. For example, if the recorder is embodied in a pipeline pig, the temperature may vary over a relatively wide range whereby the response characteristics of one or more portions of the system may vary. A temperature-responsive device 70 such as a thermister may be provided. This senses the temperature and generates a control signal which is a function of temperature. The thermistor 70 is coupled to a gain control input 72 to the driver 18 whereby the gain is varied to offset the variations otherwise produced by the temperature.

Also, it may be desirable to record supplemental data in addition to that from the probes 16. For example, if the recorder 12, etc., are embodied in a pipeline pig, it may be desirable to record information such as the angular rotation or attitude of the pig. A transducer 74 capable of sensing such data and generating a corresponding signal is coupled to a channel in the driver 18 whereby a diode is actuated for recording the supplemental data on a separate track.

After the pig has traversed the prescribed distance, it is retrieved from the pipeline. At this point a corresponding length of data film 22 will have been exposed and have a latent image. The film 22 is then developed whereby the latent image is converted into a visible image.

The visible image will contain a series of substantially parallel tracks, one track for each variable being measured. The width of each track is substantially constant. However, the density of the track varies as a function of the data from the respective source, i.e., the probe 16, etc.

The developed data film 22 may be manually inspected and reviewed to evaluate the data. For example, the film 22 may be run through a projector. The operator can then observe the enlarged image of the data tracks and interpret the characteristics of the various portions of the pipeline inspected.

This form of review requires a substantial amount of operator skill and is also very slow and time consuming. Also, it is subject to human error. In order to avoid these difficulties, the data film 22 may be fed through a cross-correlator 14 whereby the data recorded in each track is automatically evaluated and interpreted.

Figure 3:
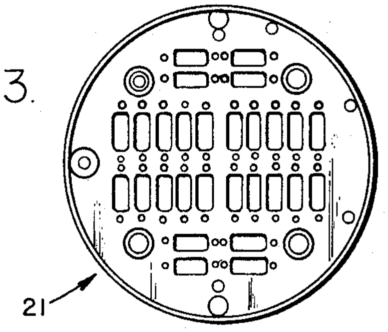
FIG. 3 is an end view of the recorder of FIG. 2.
Figure 4:
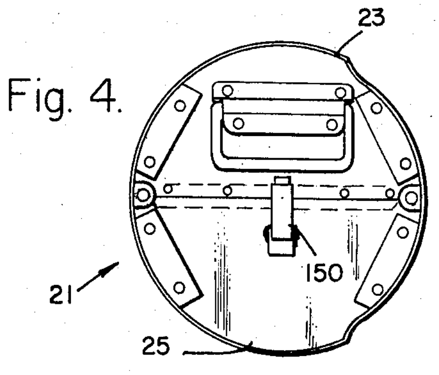
FIG. 4 is an end view of the opposite end of the recorder.
Figure 6:
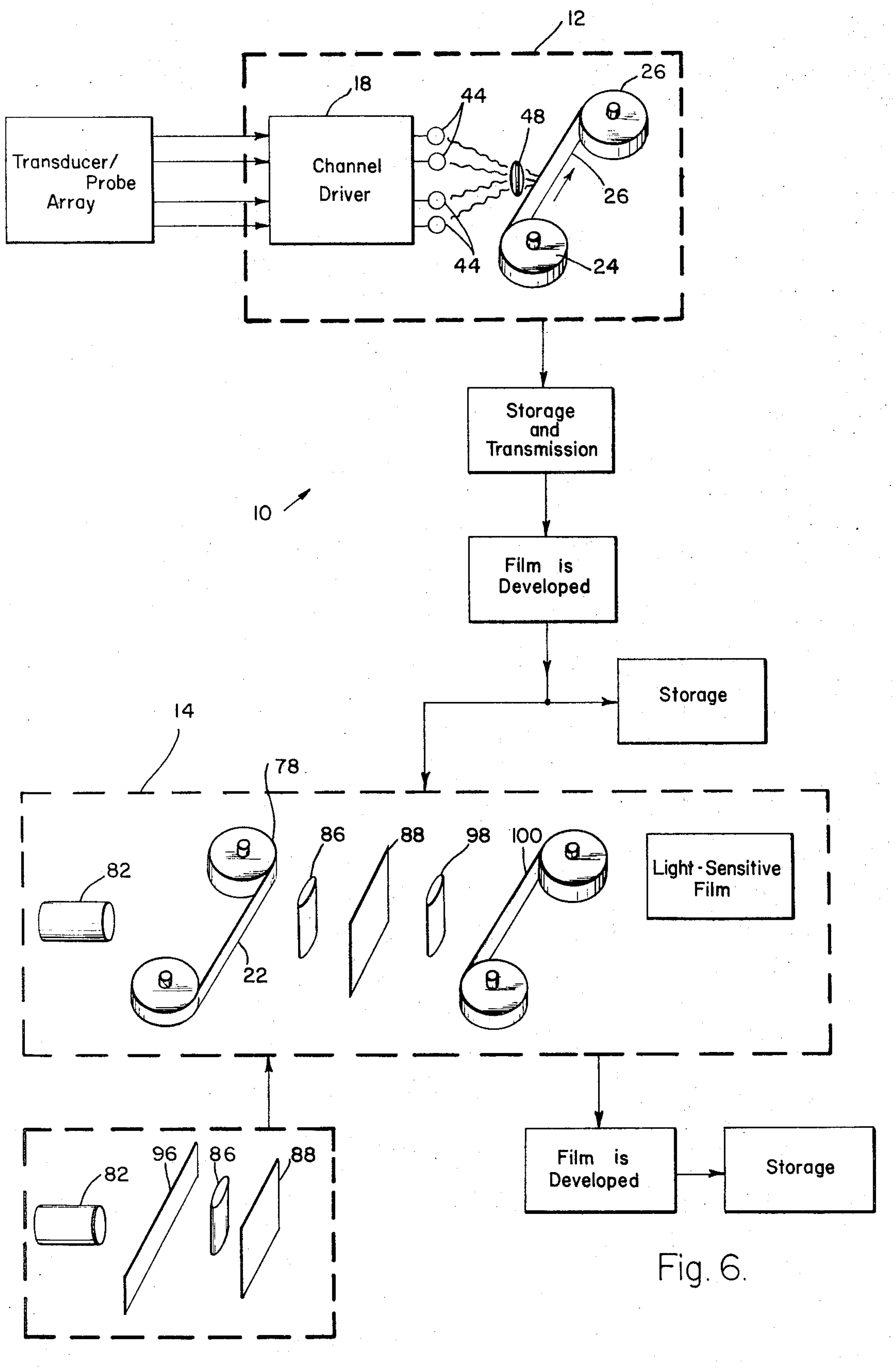
FIG. 6 is a diagrammatic showing of the nondestructive testing system and data storage/data processing system employed on the pipeline pig and embodying one form of the present invention and of the method of using said systems.
Figure 7:
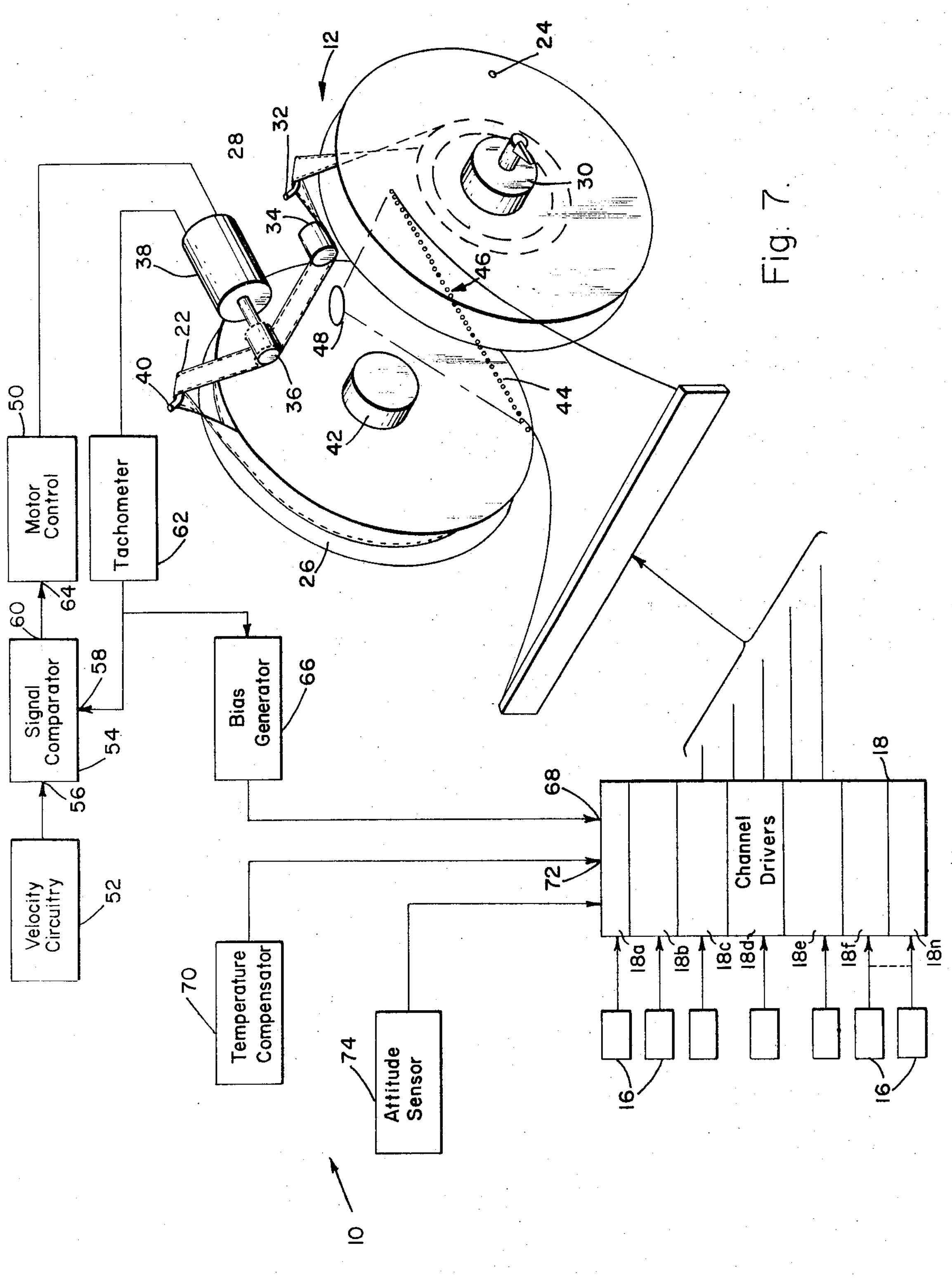
FIG. 7 is a combination block diagram and perspective view of a portion of the nondestructive testing system and of the data recorder embodied therein.
Figure 8:
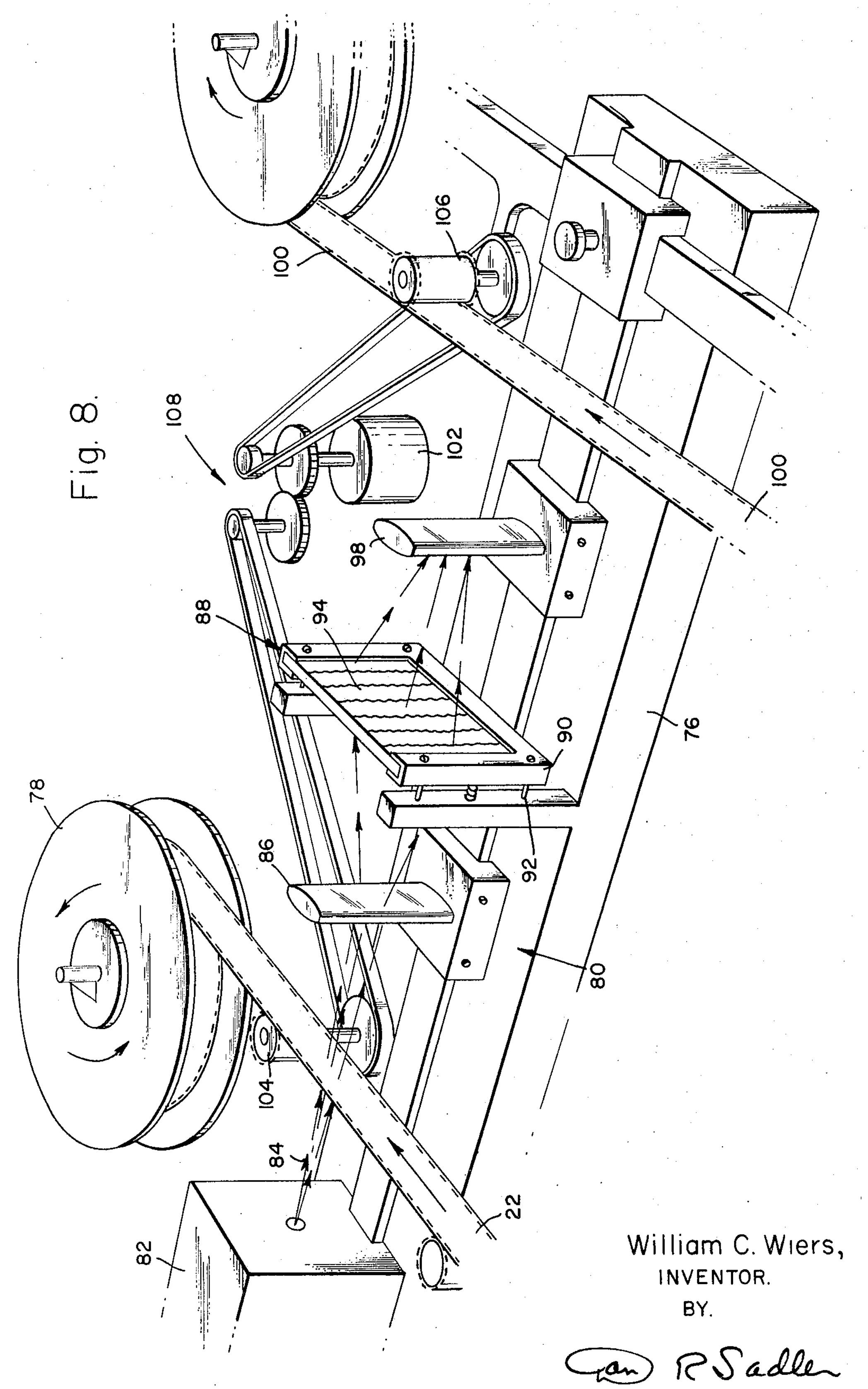
FIG. 8 is a fragmentary perspective view of a portion of a cross-correlator for use in interpreting the data accumulated and stored by the recorder of FIG. 6.

The cross-correlator 14 is best seen in FIG. 3. It is effective to correlate the patterns of the data as recorded on the data film 22 with certain preselected patterns representing conditions of particular importance and interest. In the present embodiment the correlation is accomplished by optically correlating a spatial Fourier transform of the individual tracks on the data film 22 with a corresponding spatial Fourier transform of the preselected patterns of particular interest.

The entire correlator 14 is mounted upon an optical bench 76. The data film 22 is stored in a supply reel (not shown). The data film 22 is fed from the supply reel across the optical bench 76 to a take-up reel 78.

A projection system 80 is provided for developing the spatial transform. In the present instance this includes a light source 82 for projecting a beam 84 of light through the data film 22. This light may be a coherent laser, a source of columnated monochromatic light, etc. The light passes through the film 22 whereby its intensity is modulated according to the densities of the several data tracks on the film 22.

A first lens 86 is disposed on the opposite side of the film 22 in alignment with the beam 84 of light. This lens 86 is of the cylindrical variety. The axis of the lens 86 is disposed substantially parallel to the plane of the film 22. It is also disposed parallel to the image of the diode array 46 as it was projected onto the data film 22, i.e., at right angles to the tracks.

The lens 86 is positioned a distance from the film 22 equal to its own focal length. The light which has passed through the film 22 and is incident on the lens 86 will be dispersed or expanded. At a distance from the lens 86 equal to the focal length of the lens 86, the projected image will be a spatial Fourier transform of the data stored in the various tracks on the film 22.

An optical filter 88 is disposed at one focal length from the lens 86, i.e., the location of the transform. The filter 88 is a planar member which is partially opaque and partially transparent. In order to facilitate changing the filter 88 and keeping it in a true plane, it is preferably disposed in a carrier 90. Several adjustments 92 are provided for moving the carrier 90 whereby the filter 88 is maintained accurately positioned relative to the data film 22 and to the lens 86.

The filter 88 includes an optical pattern 94 made up of various transparent and opaque portions. As a result, to the extent the image of the data film 22 as projected onto the filter 88 matches the pattern 94 of the filter 88, the light will pass through the filter 88. However, if the projected image does not match and register with the filter pattern 94, none of the projected light will pass through the filter 88.

In other words, if the spatial Fourier transform of the pattern on the data film 22 does not precisely correspond with the pattern on the filter 88, no light will pass through the filter 88. However, if there is a matched registration, the projected light will pass through the filter 88.

The filter 88 may be made as follows. A special strip of reference data film 96 is produced. This film 96 is a short strip containing a single data track. This track includes a pattern of the type which is of particular interest. For example, if the recorder 12 is being used with a non-destructive testing system and it is desired to locate a particular type of discontinuity such as a crack, the data track on the reference film 96 corresponds to patterns which would be recorded upon the data film 22 when a probe 16 passes over such a crack.

The special film strip 96 is then placed in the cross-correlator 14 in the position normally occupied by the data film 22. An unexposed sheet of film is placed in the carrier 90 and mounted at the location of the filter 88.

The source of light 82 is then momentarily energized. The special interest pattern on the film strip 96 is then projected through the lens 86 onto the unexposed film in the carrier 90 so as to expose it. The image projected onto the film and the image formed is a spatial Fourier transform of the pattern of special interest as recorded on the reference film 96.

When the film is developed and mounted in the carrier 90, the resultant filter 88 corresponds to the sptial Fourier transform of the pattern which is to be recognized.

It may be seen that as the data film 22 passes through the optical correlator 14, the light projected from the lens 86 onto the filter 88 is the spatial transform of the data recorded in the tracks. The pattern on the filter is the negative of the recordings on the data film. Normally, the patterns recorded on the data film 22 will not correspond to the pattern on the filter. Therefore, the light will be blocked by the lack of matching and registration. In the event there is a close similarity or identity between the two patterns, the light will pass through the filter 88.

This passage of light may be detected by any suitable means. For example, the operator may visually perceive the light or an array of light-sensitive elements may be employed. However, in the present instance a second lens 98 and a film 100 are provided. The second lens 98 is a cylindrical one similar to the first lens 86, and it is positioned one focal length from the filter 88. The film 100 in turn is disposed one focal length from the lens 98. As a consequence, the second lens 98 projects the passed light onto the film 100. In so doing, it will provide a second spatial transform which is the inverse of the transform produced by the first lens 86. This results in a real image being projected onto the second film 100.

This inverse transformation produces a single bright spot when, but only when, there is a matching and registry between the data transform and the pattern on the film. The vertical or transverse position of the bright spot on the film 100 will correspond to the position of the data track containing the matching pattern.

As a result, the only time that a bright spot will be produced on the second film 100 is during the occurrence of a phenomenon which is desired to be recognized. The lateral position of the bright spot on the second film 100 will correspond to the lateral position of the data track on the first film 22.

When the data signals are recorded about an intermediate bias or grey level, substantially every track on the data film 22 is substantially always visible and light reaches the filter 88 from every track. Theoretically, none of this light passes through the filter 88 except when there is a matching of patterns. However, as a practical matter there is usually a small amount of "leakage" of some light. Also, occasional "noise," etc., creates patterns which are a partial match. This results in some light reaching the second film 100. Usually the amount of this light is adequate to make the various tracks or at least their positions discernable over most of the length of the film 100.

Therefore, on the relatively rare occasions when a bright spot is present on the second film 100 it is possible to determine which of the original data tracks contained the pattern by counting across the tracks. It should also be noted that it is not necessary to maintain a precise registration or positioning of the data tracks on the first film 22 nor on the second film 100. Provided the alignment is sufficient to insure all of the tracks being present on the films, the particular track of interest can be identified by counting the tracks.

In the event the bright spots, etc., are to be detected by mechanical means, such as light-sensitive diodes, etc., a much more precise alignment and positioning of the film 22 and the tracks upon the film are essential.

It may be seen that after the recorder 12 has accumulated all of the data, the data film 22 has been developed, the data film 22 has been run through the cross-correlator 14 to expose the record film 100, and the record film 100 has been developed, an operator may very quickly review the record film 100 merely by looking for the presence of bright spots.

By observing the conspicuous bright spots, it is possible to identify the presence of particular characteristics such as flaws, etc.

By counting across the tracks on the film 100 it is possible to determine which of the probes 16 passed over the flaw, etc., and generated the signal. When the film 22 is driven at a speed which is a function of the speed at which the probes 16 are scanning the workpiece, distance on the film 22 is scaled to distance along the workpiece. Accordingly, the drive motor 102 in the cross correlator 14 is connected to the drive capstands 104 and 106 by a positive, synchronized drive 108. This insures the two films 22 and 100 being driven in precise synchronism with each other. As a consequence the distance of the bright spot along the film 100 will also be a scaled function of the position of the flow along the workpiece.

In order to employ the recorder 12 in the pipeline pig 11, the cassette 27 is loaded with the film strip 22. This strip 22 should be long enough to record all of the data to be accumulated during the trip. By way of example, the film strip 22 may be on the order of 1,000 feet long for a 6 to 8 hour trip.

The loaded cassette 27 is then placed in its position in the main-frame 29. The cover 23 is then placed in position and locked in place by the latch 150. With the sealing plug 152 removed, the housing 21 is slipped inside of the rear section 17. When the housing 21 is properly oriented within section 17 and forced all the way into the section 17, the various contacts or plugs 154 on the bulk-head 156 on the end of the housing 21 will mate with complementary contacts or sockets within the section 17.

The mating of these contacts will establish electrical circuits between the recorder 12 and the cables 158 on the outside of the section 17. These cables 158 lead to the batteries, etc., in the front section 15 and the probes 16 in the shoes 19. After the desired electrical continuity, etc., is established, the end plug 152 is screwed into position on section 17 whereby the recorder 12 is sealed inside.

Following this the pig 11 may be inserted into the pipeline 13. The fluid flowing in the pipeline 13 is effective to act against the cups or packers 160 and force the pig 11 through the pipeline. As the pig 11 travels through the pipeline, the probes 16 in the shoes 19 scan the inside of the pipeline. The signals from the probes 16 are coupled through the channel drivers 18 whereby the individual diodes 44 in the array 46 glow. This results in the film recording a corresponding number of data channels.

After the pig 11 has completed its trip through the pipeline 13, the housing 21 is removed from the section 17. The latch 150 is released whereby the cover 23 can be removed and the cassette 27 taken to the darkroom for development of the film 22. The developed film 22 is then run through the optical correlator 14. During this correlation process, if there are any recorded signals of interest they will be recorded on the record film 100.

Figure 10:
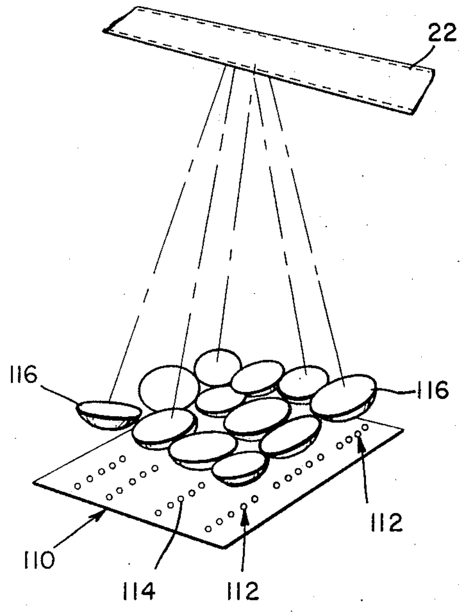
FIG. 10 is a fragmentary view of a recorder embodying another form of the invention.
Figure 9:
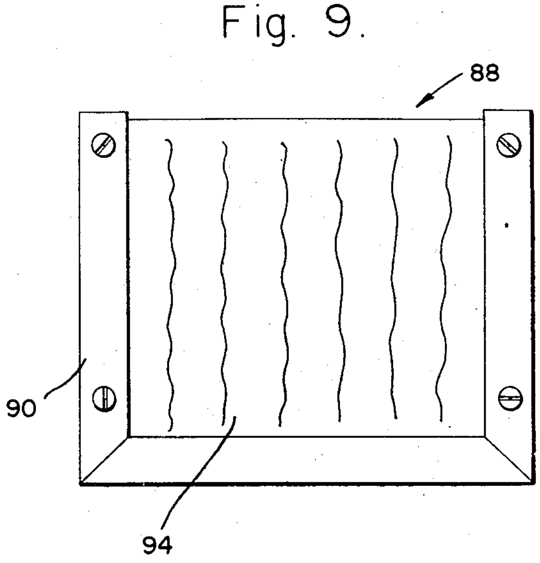
FIG. 9 is a view of an optical filter used in the cross-correlator of FIG. 7.
Figure 5:
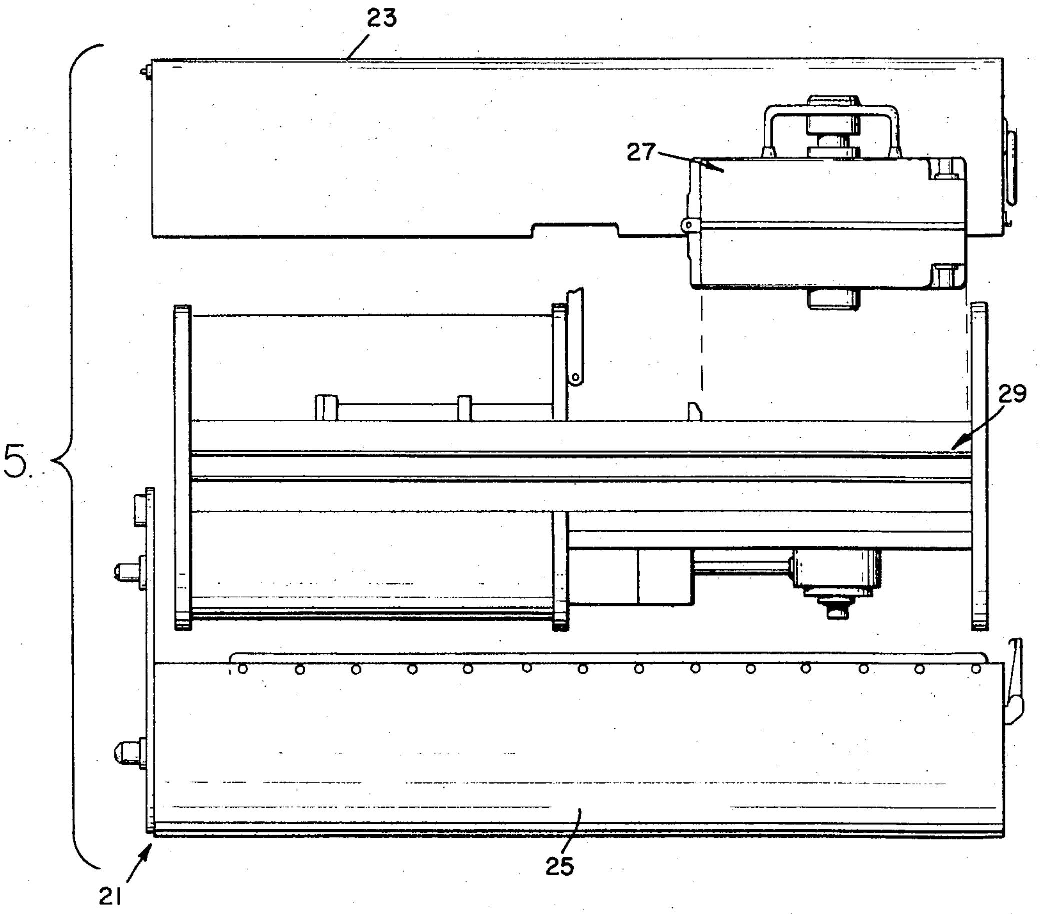
FIG. 5 is a side view of the recorder after its housing has been opened and a portion thereof removed.
Figure 2:
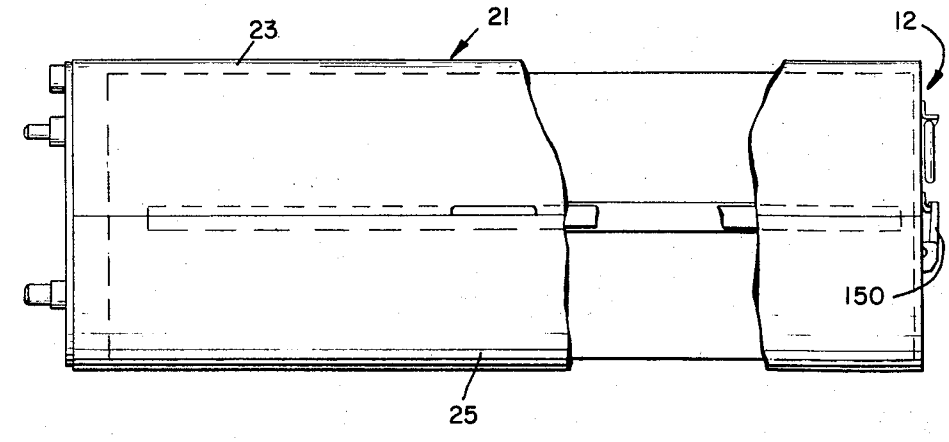
FIG. 2 is a side view of the recorder removed from the pipeline pig.

It can be appreciated that although a specific embodiment of the present invention is described herein, it may be modified and adapted for a wide variety of other applications. For example, if the cost of the recorder 12 is to be reduced and/or the extremely high concentration of data is not necessary, more conventional incandescent lights may be used instead of the light-emitting diodes. Under some circumstances it may be desirable to employ an embodiment of the recorder similar to that shown in FIG. 10. In this embodiment the unexposed film 22 is transported through the exposure area substantially the same as in the preceding embodiment. However, the light-emitting diodes are not disposed in an array comprising a straight line. Instead, the array 110 includes several groups 112 of diodes 114. A plurality of lenses 116 are arranged to project the light from the diodes 114 onto the film 22. The arrangement of the diodes 114 and lenses 116 can provide several alternatives. For example, if there is a time displacement between related signals, they can be projected onto the film 22 at different longitudinal positions. If the longitudinal displacement is equal to the distance the film travels during the time delay, the recordings will be laterally aligned with each other.

I claim:

1. A recorder for recording a plurality of separate, individual signals, said recorder including a film transport for advancing a photosensitive film through an exposure area, a variable speed motor coupled to said film transport for driving said film through said area, an array of individual lights, signal means for individually coupling each of the lights in said array to a source of said signals to be recorded, each of the individual lights being adapted to emit light at an intensity which is a function of the magnitude of its respective signal, optical means for focusing the light from the individual lights in said array onto said film as an array of bright spots while it is being advanced by the film transport, said bright spots being effective to expose the film and thereby form individual tracks having substantially uniform widths and with each of said tracks having an exposure and optical density corresponding to the magnitude of the respective signal, means connected to said signal means for providing a bias, and means responsive to the speed of the film advancing through said exposure area and coupled to said signal means for varying said bias and thereby the magnitude of the signalcoupled to said lights as a function of said speed whereby the exposure and optical density of each of said tracks is a function of the associated signals and is independent of the speed of said film through said area.

2. The recorder of claim 1 wherein the individual lights in said array are light-emitting diodes.

3. The recorder of claim 1 wherein said signal means for coupling the signal sources to the lights in said array includes a separate channel for each of the signals, and an adjustable gain amplifier in each of said channels for separately controlling the gain of the individual signals coupled to said lights whereby the amplified signals are all normalized to a reference standard whereby the densities of the individual tracks are all the same function of the magnitude of the signal.

4. The recorder of claim 3 wherein
the individual lights in said array are light-emitting diodes.

5. A recorder for recording a plurality of separate individual data signals from a plurality of sources, said recorder including
a film transport for advancing a photosensitive film,
a variable speed motor coupled to said film transport for driving said film at a variable speed,
control means responsive to the speed of said film and effective to produce a control signal,
an array of individual lights,
a plurality of channels for individually coupling each of the lights in said array to a respective one of the sources of the data signals to be recorded, each of the individual lights being adapted to emit light in response to its respective data signal,
means coupling said control means to said channels to vary the gain thereof as a function of said control signal whereby the intensities of said lights are functions of said data signals and control signals,
means for focusing the light from the individual lights in said array onto said film as an array of bright spots while it is being advanced by the film transport, said bright spots being effective to form individual tracks having substantially uniform widths and optical densities that vary corresponding to the respective data signals but independent of the speed of said film, and
means in said channels for adding a bias to said signals to provide a reference level whereby visible tracks are produced even though said signals are zero.

6. The recorder of claim 5 wherein
the individual lights in said array are light-emitting diodes.

7. The recorder of claim 5 wherein
each channel has an adjustable gain whereby all of said signals are normalized to a reference standard so the density of each track is a function of its respective signal.

* * * * *